United States Patent [19]
Smith

[11] Patent Number: 5,814,270
[45] Date of Patent: Sep. 29, 1998

[54] APPARATUS AND METHOD FOR THE FORMATION OF A BATHTUB OR SHOWER STALL LINER

[75] Inventor: Mark Conrad Smith, Wood Dale, Ill.

[73] Assignee: Luxury bath Liners, Inc., Bensenville, Ill.

[21] Appl. No.: 617,616

[22] Filed: Mar. 19, 1996

Related U.S. Application Data

[60] Provisional application No. 60/008,664 Dec. 15, 1995.

[51] Int. Cl.$^6$ .................................................. B29C 51/10
[52] U.S. Cl. .......................................... 264/553; 425/388
[58] Field of Search ................................... 264/553, 510, 264/511, 512; 425/388; 4/580, DIG. 18

[56] References Cited

U.S. PATENT DOCUMENTS

| | | | |
|---|---|---|---|
| 3,593,347 | 7/1971 | Nemiroff | 4/580 |
| 3,614,793 | 10/1971 | Nemiroff | 4/580 |
| 4,067,071 | 1/1978 | Altman et al. | 4/580 |
| 4,158,585 | 6/1979 | Wright | 4/580 |
| 4,750,967 | 6/1988 | Kott et al. | 156/500 |

*Primary Examiner*—Catherine Timm
*Attorney, Agent, or Firm*—Factor and Shaftal

[57] ABSTRACT

Bathtub or shower stall liner vacuum forming system for the forming of a liner to be positioned over an existing bathtub comprises a bathtub liner vacuum machine, a plumbing apparatus and a lift for moving the plumbing apparatus. The bathtub liner vacuum machine comprises a frame member, a track member, an oven and a skirt forming member. The plumbing apparatus includes a conventional plumbing fixture, a manifold, mesh member and a vacuum pump. Upon positioning of the formable member within the frame member and skirt forming member, the frame member is rolled along the track member into the oven. When the formable member is heated to the desired temperature, the bathtub is positioned into contact with the formable member and the air trapped therebetween is removed with the aid of the vacuum pump. As the air is evacuated, the formable member takes on the configuration of the conventional plumbing apparatus and mesh member. The invention further includes a method for forming a bathtub liner.

13 Claims, 2 Drawing Sheets

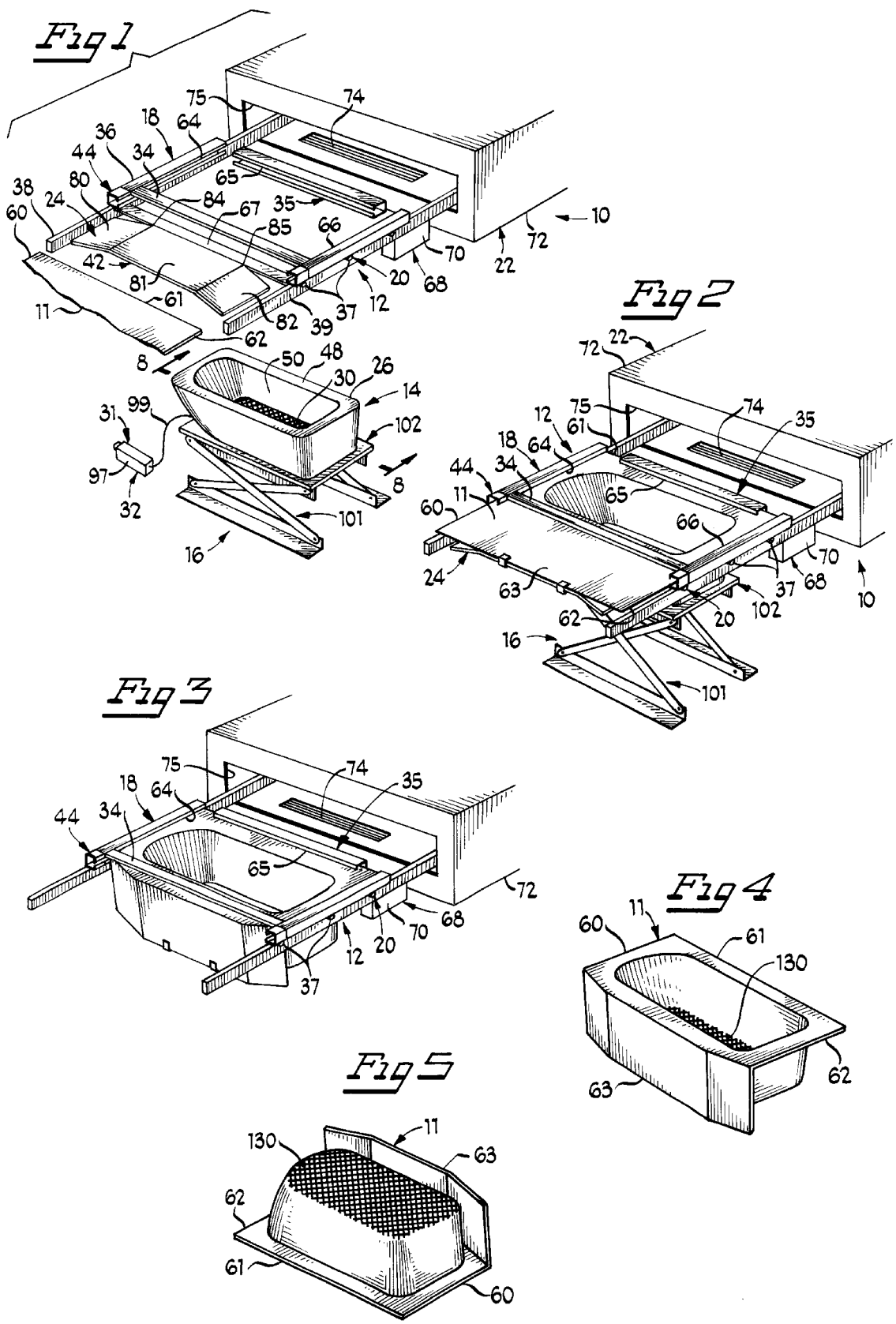

APPARATUS AND METHOD FOR THE FORMATION OF A BATHTUB OR SHOWER STALL LINER

This Application depends from Provisional patent application Ser. No. 60/008,664 entitled Bathtub Liner Forming System filed on Dec. 15, 1995.

BACKGROUND OF THE INVENTION

1. Field of the Invention

This invention is directed generally to bathtub and shower stall liners, and, more specifically, to a system for molding bathtub and shower stall liners.

2. Background Art

Lining devices for rejuvenating a bathroom have been around for many years. Bathtubs and shower stalls generally have a durable finish that is intended to last many years. However, after years of use, the porcelain or enamel over its iron surface of a bathtub may become damaged. Such damage may include abrasions, chips through the enamel exposing the underlying iron, and, rust that has permanently discolored the surface. At some point it becomes necessary to entirely replace the tub or stall.

Replacing a bathtub, especially in an older home, is prone to many problems. First, inasmuch as the tub was likely installed many years ago, it may be difficult to even loosen the tub such that it may be removed from the bathroom. Further, due to the many manufacturers over the years, many different tubs having different dimensions and surface features exist. As such, it may be difficult to find a replacement tub that has the same dimensions. Accordingly, the area may have to be redimensioned. Moreover, due to the durable construction of a tub, the costs associated with a tub replacement tend to make full replacement quite expensive.

To address the cost considerations, certain tubs have been constructed from thermoplastic materials. For example, these tubs do not solve all of the problems associated with tub replacement. While the cost of these thermoplastic tubs is substantially less than a new porcelain or enamel tub, they are structurally weaker and are prone to stress failures and fractures. Further, they do not come in a variety of dimensions such that, after the old tub is removed, reconfiguration of the bathroom area may still be necessary.

The invention disclosed herein solves many of the problems associated with the remodeling of a bathtub or shower stall. A new liner that virtually identically matches the existing tub is installed over the existing tub. As a result, this liner eliminates the problems associated with removal of the old bathtub and the problems associated with finding a bathtub that is properly dimensioned. Further, inasmuch as the old tub still forms the structural component of the bathtub, the potential for problems related to stress, strain and torsion are greatly reduced, if not eliminated.

SUMMARY OF THE INVENTION

The present invention is concerned with a bathtub or shower stall liner forming system for the forming of a bathtub or shower stall liner from a formable member. The liner vacuum forming system includes a liner vacuum machine, a plumbing apparatus and means for removing the formable member from the plumbing apparatus.

The liner vacuum machine comprises means for retaining the formable member within the liner vacuum machine and means for heating the formable member to a predetermined elevated temperature.

The plumbing apparatus is releasably associated with the liner vacuum machine. The plumbing apparatus is positionable into contact with at least a portion of one of the formable member and formable member retaining means. The plumbing apparatus comprises a conventional plumbing fixture, a manifold and means for drawing air from within the interior region of the conventional plumbing fixture.

The conventional plumbing fixture includes an interior region and a bottom surface. The manifold is operatively associated with at least the bottom surface of the conventional plumbing fixture. The manifold includes at least one opening associated with the interior region of the conventional plumbing fixture. The means for drawing air through the manifold draws the formable member into contact with the conventional plumbing fixture.

The invention is further directed to a method for making a bathtub or shower stall liner from a formable member including the steps of: (a) attaching a formable member to a bathtub liner vacuum machine, the bathtub liner vacuum machine having a retaining structure for the formable member; (b) heating the formable member to a desired elevated temperature so that the formable member becomes malleable; (c) positioning the formable member into operative engagement with a plumbing apparatus so as to make a substantially air tight seal therebetween; (d) evacuating the air from within the plumbing apparatus, to draw the at least a portion of the formable member toward the plumbing apparatus; and (e) removing the formable member from within the plumbing apparatus.

BRIEF DESCRIPTION OF THE DRAWINGS

For a better understanding of the present invention, reference may be had to the accompanying drawings in which:

FIG. 1 of the drawings is a perspective view of the present bathtub or shower stall liner formation machine, prior to the positioning of the formable member;

FIG. 2 of the drawings is a perspective view of the liner formation machine, after the heating and the beginning the formation of the formable member;

FIG. 3 of the drawings is a perspective view of the liner formation machine, after the rotation of skirt forming member;

FIG. 4 of the drawings is a perspective view of the formed formable member;

FIG. 5 of the drawings is a perspective view of the underside of the formed formable member, showing in particular the slip prevention means;

DETAILED DESCRIPTION OF THE DRAWINGS

Figure 6:
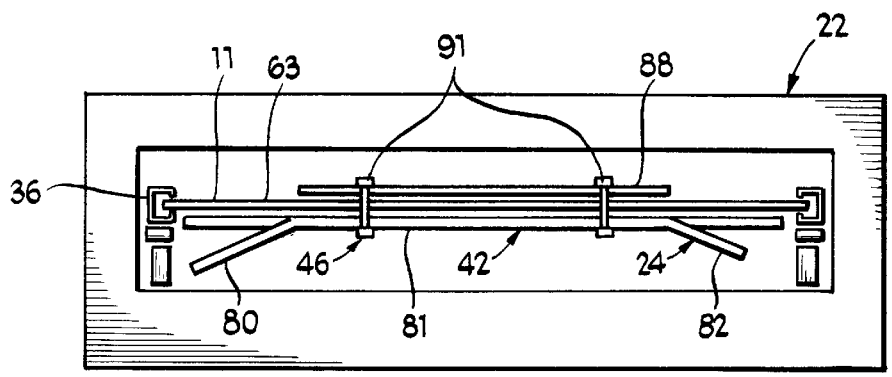
FIG. 6 of the drawings is a front plan view of the liner formation machine, showing in. particular the partial clamping of the skirt member.

While this invention is susceptible of embodiment in many different forms, there is shown in the drawings and will herein be described in detail, a specific embodiment with the understanding that the present disclosure can be considered as an exemplification of the principles of the invention and is not intended to limit the invention to the embodiments illustrated.

Bathtub or shower stall liner vacuum forming system 10 is seen in FIG. 1 and FIG. 2 as comprising formable member 11, liner vacuum machine 12, plumbing apparatus 14 (FIG. 8) and plumbing apparatus movement means 16. Formable member 11 (FIG. 1, FIG. 4 and FIG. 5) comprises a thermoplastic panel having edges 60, 61, 62 and skirt region 63. Preferably, the formable member comprises a co-extruded ABS thermoplastic sheet having uniform thickness, however other configurations and materials are also contemplated. Liner vacuum machine 12 comprises means 18 for releasably retaining formable member 11, means 20 for positioning the formable member, means 22 for heating the formable member and means 24 for forming a skirt member.

Releasable retaining means 18 is seen in FIG. 1, FIG. 2 and FIG. 3 as comprising frame member 35, hydraulic clamps, such as hydraulic clamp 36, and flat plate member 34. Frame edge members 64, 65 and 66 and frame support member 67 (FIG. 1) are dimensioned to receive edges 60, 61, 62 and skirt region 63 of formable member 11, respectively. Hydraulic clamps, such as hydraulic clamp 36, are positioned above frame member 35. The hydraulic clamps serve to clamp formable member at edges 60, 61, 62 to respective frame edge members 64, 65, and 66. Flat plate member 34 is positioned over skirt region 63 of formable member 11, and precludes inadvertent movement of skirt region 63 of formable member 11. Of course, manual clamps as well as alternative clamping structures are also contemplated to retain formable member 11 to frame member 35.

Positioning means 20 is seen in FIG. 1, FIG. 2 and FIG. 3 as comprising rolling members, such as rolling members 37, support beam members 38, 39 and driving means 68. The support beam members 38, 39 may be positioned in parallel, and at a distance similar to frame edge members 64, 66 respectively. Rolling members, such as rolling member 37, are associated with frame edge members 65, 66. Rolling members, such as rolling member 37, are positioned on frame edge members 64, 66, such that frame edge members 64, 66 form a track upon which the rolling members travel. Driving means 68 is operably associated with support beam members 38, 39 and with frame member 35. Driving means 68 facilitates rolling movement of frame member 35 relative to support beam members 38, 39. While driving means 68 may comprise electric motor 70, it is also contemplated that the driving means comprise an hydraulic movement system, or any other conventional driving systems, such as, among others, a mechanical leverage device operated by hand.

Heating means 22 comprises oven 72 having an opening 75, upper burners (not shown) and lower burners 74. Oven 72 is positioned so that the ends of support beam members 38, 39, reach into the oven (through opening 75) a sufficient distance, thus permitting placement of formable member 11 within oven 72. The upper burners and lower burners 74 are respectively positioned above and below opening 75 at a distance sufficient to evenly heat the formable member to a malleable temperature without burning or scalding any portions of the formable member. It is contemplated that oven 72 may comprise any conventional heating systems, such as natural gas fired or electric systems.

Figure 7:
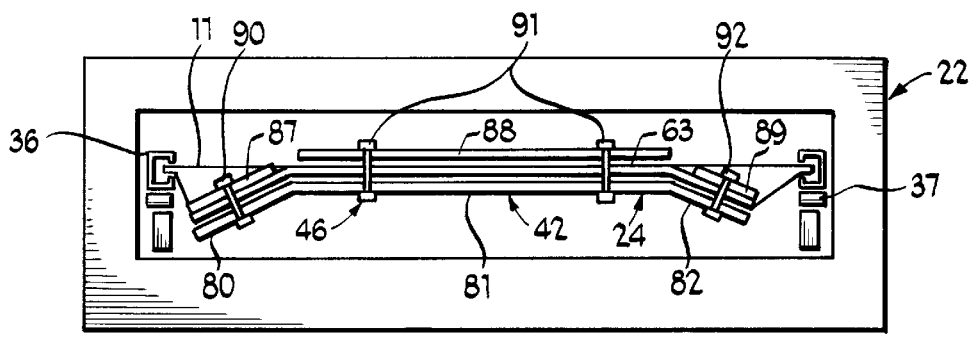
FIG. 7 of the drawings is a front plan view of the liner formation machine, showing in particular the full clamping of the skirt member.

Skirt forming member 24 (which is used to form a front skirt of the molded liner) is shown in FIG. 1, FIG. 6 and FIG. 7 as comprising skirt forming panel 42, stretching means 44 (FIG. 1) and skirt clamping means 46. Skirt forming panel 42 comprises forming panels 80, 81, 82, and attachment members 84, 85. Attachment members 84, 85 of skirt form panel 42 are attached to frame support member 67 in a substantially parallel orientation to each other. Skirt forming panel 42 is capable of both rotational movement and transverse movement, relative to frame member 35, about the axis which is created by attachment members 84, 85. Of course, various skirt form panel configurations having a fewer or greater number of forming panels, or even designs, integrated into the forming panels, are also contemplated.

Stretching means 44 is shown in FIG. 1 as comprising hydraulic cylinders (not shown), which force skirt forming member 24 transversely along support beam members 38, 39. Stretching means 44 facilitates movement of skirt forming member 24 away from frame member 35. It is also contemplated that stretching means comprise a manually (hand) operated lever, as well as an electric system.

Skirt clamping means 46 is shown in FIG. 6 and FIG. 7 as comprising protector panels 87, 88, 89 and clamps 90, 91, 92. The protector panels 87, 88, 89 are positioned over forming panels 80, 81, 82, sandwiching skirt region 63 of formable member 11, therebetween. The protector panels are maintained in a desired position by clamps 90, 91, 92. Of course, a single protector panel configured to match the skirt frame member, as well as multiprotector panels are also contemplated. Additionally, the protector panel may also be carved such that once positioned, the formable member could eventually be molded to the carved shape of the protector panel.

Figure 8:
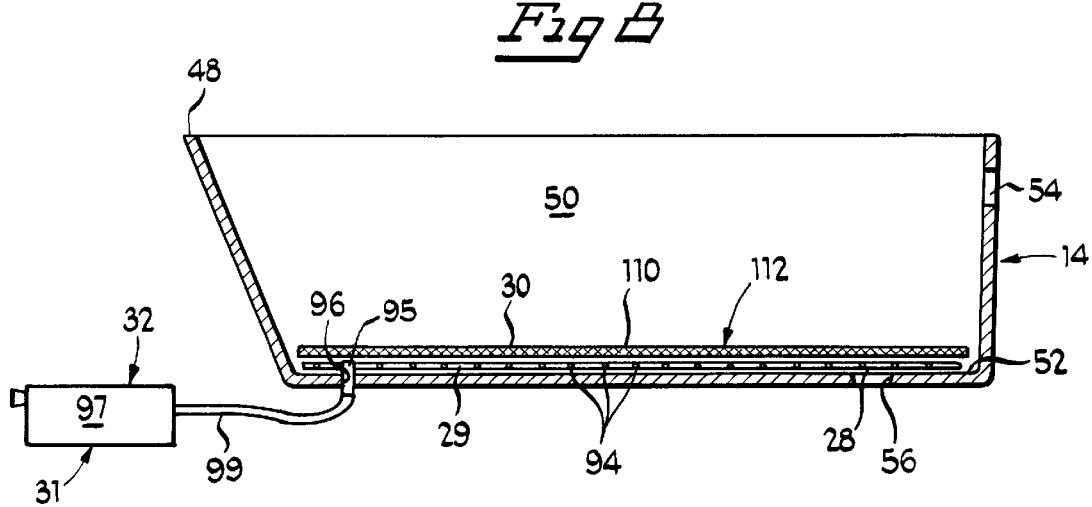
FIG. 8 of the drawings is a cross-sectional view of the plumbing apparatus, taken generally along line 8—8 of FIG. 1.

Plumbing apparatus 14 is shown in FIG. 1 and FIG. 8 as comprising plumbing fixture 26, manifold 28 (FIG. 8), means 110 for forming a non-slip surface, means 112 for precluding inadvertent contact, drawing means 31 and means 32 for cooling formable member 11. Plumbing fixture 26 may comprise a conventional porcelain, cast iron, or the like, bathtub or shower stall, having outer rim 48, interior surface 50, bottom surface 52, overflow outlet 54 and drain 56.

Manifold 28 comprises a series of tubes, such as tube 29, and junction member 95. Manifold 28 is positioned above bottom surface 52 of plumbing fixture 26. Each tube, such as tube 29 includes holes, such as hole 94 extending through tube 29. Junction member 95 includes outlet opening 96. Each tube, such as tube 29, is operably associated with junction member 95. While other shapes, sizes and relative distances are contemplated, the holes are circular and positioned approximately two inches away from each other, so as to facilitate uniform drawing of formable member toward plumbing fixture 26. It is also contemplated that the manifold comprise a series a holes through bottom surface of plumbing fixture 26 having junction member 95 below the bottom surface of plumbing fixture 26.

Means 111 for precluding inadvertent contact and means 110 for forming a non-slip surface comprise mesh surface 30 of plumbing apparatus 14. The mesh surface comprises a diamond-shaped mesh extending over manifold 28, positioned on bottom surface 52 of plumbing fixture 26. Means 111 for precluding inadvertent contact, and, in turn, mesh surface 30 protect manifold 28 from inadvertent contact with formable member 11, while not covering the openings contained thereon. Means 1 10 for forming a non-slip surface, and, in turn, the mesh surface additionally provide for the formation of the diamond mesh pattern on at least portion of the formable member. While the mesh is of a uniform repeating diamond-shaped configuration, other configurations are certainly contemplated.

Means 31 for drawing air through outlet opening 96 comprises vacuum means 97 and hose 99. Hose 99 is connected to outlet opening 96 at one end and to vacuum means 97. Vacuum means 97 may comprise an electric pump of the proper power to create enough vacuum to draw the formable member toward the tub.

Means 32 for cooling formable member comprises forcing ambient air through hose 99 into manifold 28 to reduce the temperature of formable member 11 and plumbing fixture 26. This may be achieved by reversing vacuum means 97. It is also contemplated that the cooling means may also comprise fans positioned proximate plumbing fixture 26 which force air directly toward interior surface 50 of plumbing fixture 26.

Plumbing apparatus movement means 16 is shown in FIG. 1 and FIG. 2 as comprising lift means 101 and base member 102. Plumbing apparatus movement means 16 is positioned under positioning means 20 and is adjustable from a lowered position, wherein the lift means is fully collapsed, to a raised position, wherein outer rim 48 of plumbing fixture 26 is coplanar with formable member 11. Lift means 101 comprises a conventional hydraulic "scissor" lift—although other lifting mechanisms are also contemplated. Base member 35 comprises a substantially horizontal surface which is operably attached to lift means 101. Plumbing fixture 26 is releasably positioned on base member 102. The weight of plumbing fixture 26 precludes inadvertent movement of plumbing fixture 26 relative to base member 102 without additional mounting.

In operation, and as seen in FIG. 2, formable member 11 is positioned on frame member 35. Specifically edges 60, 61, 62 are positioned into frame edge members 64, 65 and 66 respectively, while region 63 is positioned over frame support member 67. Hydraulic clamp 36 is engaged over edges 60, 61, 62 and flat plate member 34 is positioned over region 63 to retain formable member 11 in a desired orientation to, in turn, prevent inadvertent movement of the formable member relative to the frame member.

Further, as seen in FIG. 6 and FIG. 7, formable member 11 is also releasably attached to skirt forming member 24. Specifically, protector panel 88 is positioned over forming panel 81, sandwiching formable member 11 therebetween. Protector panel 88 is prohibited from movement by the attachment of clamp 91 (FIG. 6). Inasmuch as the formable member, prior to heating, is not malleable, protector panels 87, 89 are not installed at the same time as panel 88 is installed over formable member 11 (FIG. 6).

Upon positioning in the desired orientation, frame member 35, skirt forming member 24 and, in turn, formable member 11 are rolled along support members 38, 39 through opening 75 of oven 72. The upper burner (not shown) and lower burners 73 respectively heat formable member 11 until at least region 63 of formable member 11 is sufficiently malleable to facilitate sandwiching of formable member 11 between protector panels 87, 89 and forming panels 80, 82. Clamps 90, 92, like clamp 91, are positioned to retain protector panels in the proper orientation (FIG. 7).

Formable member 11 is further heated in oven 72 to a desired elevated temperature. Once the formable member has reached the desired temperature, frame member 35, skirt forming member 24, and, in turn, formable member 11 are positioned over plumbing apparatus 14. Skirt forming panel 42 is then rotated about attachment members 84, 85 until the skirt forming panel 42 is in a substantially vertical orientation. Once locked in the vertical position, the forming panel is transversely moved away from frame member 35, to stretch skirt region 63 of formable member, to, in turn, eliminate any surface imperfections on the formable member which may have been introduced through rotation of skirt forming panel 42 about attachment members 84, 85.

Next, plumbing apparatus 14 is lifted via lift means 101 until upper rim 48 of plumbing fixture 26 is in uniform contact with formable member 11. Vacuum means 97 (FIG. 2), which is connected to manifold 28 (FIG. 8), is activated to remove air from the interior of plumbing fixture 26. As the air is evacuated, formable member 11 is drawn toward and into contact with interior surface 50 of plumbing fixture 26 and mesh surface 30 (FIG. 1 and FIG. 8) on the bottom surface 52 of plumbing fixture 26 (FIG. 8). Once substantially all of the air has been evacuated, formable member 11 has generally taken on the configuration of the interior surface 50 of plumbing fixture 26, including any specific openings of the tub, such as overflow outlet 54 and drain 56. Further, due to contact with mesh surface 30, a raised diamond surface configuration 130 is formed in formable member 11 (FIG. 4 and FIG. 5), which also serves to create a "non-slip" surface on the bottom of the formable member (now the formed liner).

Prior to removal of formable member 11, which now conforms fully to the shape of plumbing fixture 26, from the bathtub liner vacuum forming system 10, ambient air is forced by vacuum means 97 operating in reverse at a lower pressure through hose 99, eventually emanating from holes such as hole 94 (FIG. 8) in tube 29 of manifold 28, to reduce the temperature of formable member. While the pressure of this ambient air is insufficient to alter the shape of the now formed formable member (FIG. 4 and FIG. 5), the air will cool formable member 11 such that it may be removed from bathtub liner vacuum forming system 10 by hand (FIG. 4 and FIG. 5).

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What I claim is:

1. A method for making a bathtub or shower stall liner from a formable member comprising the steps of:
    (a) retaining the formable member on a bathtub liner vacuum machine, the bathtub liner vacuum machine having means for retaining the formable member;
    (b) attaching a portion of the formable member to a skirt forming member, the skirt forming member associated with the retaining means;
    (c) heating the formable member to a desired elevated temperature so that the formable member becomes malleable;
    (d) positioning the formable member into operative engagement with a plumbing apparatus so as to make a substantially air tight seal therebetween;
    (e) evacuating the air from within the plumbing apparatus, to draw at least a portion of the formable member toward the plumbing apparatus to form the bathtub or shower stall liner;
    (f) forming a skirt from the portion of the formable member while the portion of the formable member is attached to the skirt forming member; and
    (g) removing the bathtub or shower stall liner from within the plumbing apparatus.

2. The method according to claim 1 further including the step of cooling the formable member after the step of evacuating the air from within the plumbing apparatus, to, in turn, facilitate removal of the formable member from the plumbing apparatus.

3. The method according to claim 1 wherein the step of forming a skirt comprises the step of rotating the skirt forming member relative to the formable member retaining means.

4. The method according to claim 3 wherein the step of rotating the skirt forming member relative to the formable member retaining means comprises the rotation of the skirt forming member through an arcuate distance of substantially a quarter turn.

5. The method according to claim 1 further comprising the step of forming a non-slip surface on the formable member.

6. The method according to claim 1 further comprising the step of stretching at least a portion of the formable member.

7. The method according to claim 6 wherein the step of stretching comprises the step of transversely moving the skirt forming member relative to the retaining means, to, in turn, smoothen the region proximate the skirt.

8. The method according to claim 1 wherein the step of heating comprises the step of slidably inserting the formable member into an oven.

9. A method for making a bathtub or shower stall liner from a formable member comprising the steps of:

(a) retaining the formable member on a bathtub liner vacuum machine, the bathtub liner vacuum machine having means for retaining the formable member;

(b) positioning at least a portion of the formable member on a skirt forming panel, the skirt forming panel operably associated with the formable member retaining means and with skirt clamping means;

(c) clamping the skirt clamping means to the formable member and the skirt forming panel;

(d) heating the formable member to a desired elevated temperature so that the formable member becomes malleable;

(e) positioning the formable member into operative engagement with a plumbing apparatus so as to make a substantially air tight seal therebetween;

(f) evacuating the air from within the plumbing apparatus, to draw at least a portion of the formable member toward the plumbing apparatus to form the bathtub or shower stall liner;

(g) forming the portion of the formable member while the portion of the formable member is on the skirt forming panel into a skirt; and (h) removing the bathtub or shower stall liner from within the plumbing apparatus.

10. The method according to claim 9 further including the step of stretching at least a portion of the formable member.

11. The method according to claim 9 further comprising the step of forming a skirt from the formable member through movement of the skirt forming panel relative to the formable member retaining means.

12. The method according to claim 11 wherein the step of forming the skirt further comprises the step of rotating the skirt forming panel relative to the formable member retaining means a predetermined arcuate distance.

13. The method according to claim 10 wherein the step of stretching comprises the step of transversely moving the skirt forming panel relative to the formable member retaining means, to, in turn, smoothen the region proximate the skirt.

* * * * *